United States Patent [19]

Magnuson et al.

[11] Patent Number: 4,895,199
[45] Date of Patent: Jan. 23, 1990

[54] TIRE INFLATION AND DEFLATION VALVE

[75] Inventors: Roland A. Magnuson, Seattle; Robert G. Shires, Kent, both of Wash.

[73] Assignee: Paccar Inc, Bellevue, Wash.

[21] Appl. No.: 138,647

[22] Filed: Dec. 28, 1987

Related U.S. Application Data

[62] Division of Ser. No. 893,081, Jul. 19, 1986, Pat. No. 4,744,399.

[51] Int. Cl.$^4$ .................................................. B60C 23/00
[52] U.S. Cl. ......................................... 152/415; 137/102; 137/224; 137/226; 141/4; 141/38; 141/197
[58] Field of Search ............... 152/415, 417, 418, 429; 137/223, 224, 226, 102; 417/231, 233; 141/38, 46, 3, 4, 66, 94, 95, 98, 192, 196, 197, 198; 340/58; 307/9, 10 R

[56] References Cited

U.S. PATENT DOCUMENTS

| | | | |
|---|---|---|---|
| 2,156,841 | 5/1939 | Davis | 152/417 |
| 2,224,042 | 12/1940 | Embree et al. | 152/417 |
| 2,634,783 | 4/1953 | Turek et al. | 152/417 |
| 2,634,784 | 4/1959 | Fitch | 152/417 |
| 2,685,906 | 8/1954 | Williams | 152/417 |
| 2,693,841 | 11/1954 | Webster, Jr. | 152/417 |
| 2,747,640 | 5/1956 | Kress | 152/417 |
| 2,780,267 | 2/1957 | Richards et al. | 152/417 |
| 2,849,047 | 8/1958 | Lamont et al. | 152/417 |
| 2,989,999 | 6/1961 | Holbrook et al. | 152/416 |
| 3,276,502 | 10/1966 | Ruf | 152/417 |
| 3,276,503 | 10/1966 | Kilmarx | 152/417 |
| 4,019,552 | 4/1977 | Tsuruta | 152/417 |
| 4,418,737 | 12/1983 | Goodell et al. | 152/416 |
| 4,421,151 | 12/1983 | Stumpe | 152/417 |
| 4,434,833 | 3/1984 | Swanson et al. | 152/417 |
| 4,470,506 | 9/1984 | Goodell et al. | 152/417 X |
| 4,498,515 | 2/1985 | Holtzhauser et al. | 152/417 |

FOREIGN PATENT DOCUMENTS

| | | |
|---|---|---|
| 0071278 | 2/1983 | European Pat. Off. . |
| 0164916 | 12/1985 | European Pat. Off. . |
| 0164917 | 12/1985 | European Pat. Off. . |
| 694475 | 7/1953 | United Kingdom . |
| 1580240 | 11/1980 | United Kingdom . |

Primary Examiner—Michael W. Ball
Assistant Examiner—Thomas E. Bokan
Attorney, Agent, or Firm—Seed and Berry

[57] ABSTRACT

A central tire inflation and deflation system which quickly inflates or deflates tires to any one of a plurality of pressures selected by the vehicle operator. Inflation pressure is greater than the pressure to which the tires are to be inflated. The system uses a tire valve which deflates the tires when a pressure less than the instantaneous tire pressure but greater than a minimum value is applied to the valve. Pressure on rotary seals which connect the tires to the system is relieved when the system is not operating.

8 Claims, 3 Drawing Sheets

DEFLATE $\frac{P_T}{4} < P_S < P_T$

EQUAL PRESSURE $P_S \simeq P_T$

INFLATING $P_S > P_T$

STATIC $P_S < \frac{P_T}{4}$

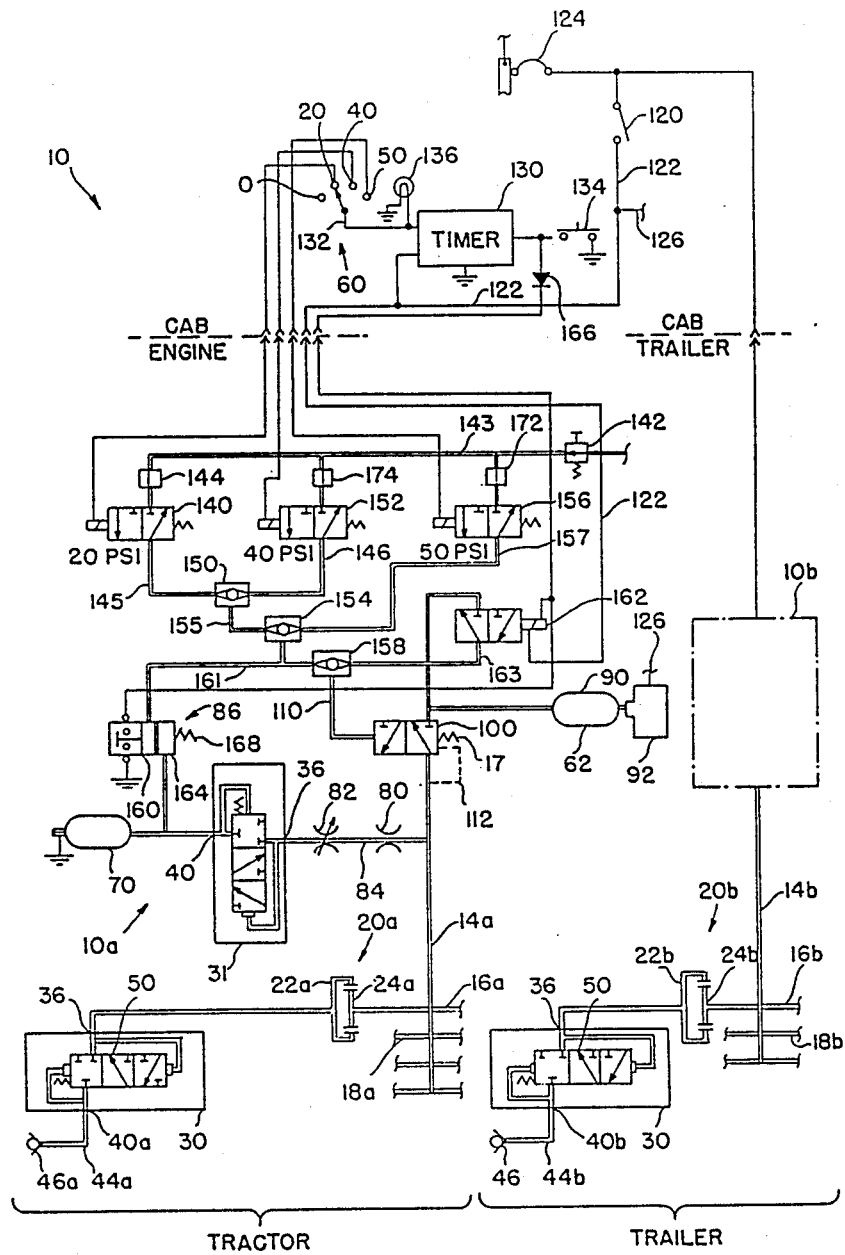

TIRE INFLATION AND DEFLATION VALVE

This application is a division of U.S. patent application Ser. No. 893,081, filed July 31, 1986, now U.S. Pat. No. 4,744,399 issued on May 17, 1988.

TECHNICAL FIELD

The invention relates to a system for remotely inflating and deflating pressurized tires on a vehicle. Specifically, the invention relates to an inflation/deflation system for use on vehicles utilizing one rotary air seal on an air distribution between each tire and a pressure source.

BACKGROUND OF THE INVENTION

Systems for remotely inflating and deflating vehicle tires are well known in the art. It is known that a tire which has a relatively large footprint has superior traction and increased rolling resistance as compared to a tire with a relatively small footprint. Therefore, the ability of a pneumatic tire to have sufficient traction on soft terrain such as sand and satisfactory rolling resistance on hard terrain such as a highway can be achieved by varying the inflation pressure of the tire.

Typical systems which allow the operator of a vehicle to vary the pressure in pneumatic tires according to changing driving conditions are disclosed by Turek, U.S. Pat. No. 2,634,783; Holbrook, U.S. Pat. No. 2,989,999; Ruf, U.S. Pat. No. 3,276,502 and Goodell et al., U.S. Pat. No. 4,418,737. In all of these systems, an air passageway is maintained between the vehicle tire and the adjacent nonrotating portion of the vehicle through rotary seals. Because an air passageway is maintained between relative rotating members, significant technical problems must be overcome to provide a durable system which allows the operator to easily inflate or deflate the vehicle's tires.

One particularly acute problem has been addressed by some of the prior art system in a less than satisfactory manner. It is known that continuous pressurization of the rotary seals in these systems substantially reduces the life of the seals. In U.S. Pat. No. 4,498,515 to Holtzhauser et al., a pilot operated valve on the rotating tire is utilized to isolate the tire so that fluid pressure on the rotary seals can be relieved when the system is neither inflating nor deflating the tires. The Holtzhauser system disadvantageously achieves this result by utilizing separate fluid passageways for piloting the valve and for delivering air to and from the tire for inflation and deflation respectively. Thus, two passageways are drilled or otherwise provided through structural members which must support the weight of the vehicle on the rotating tires. On vehicles designed to carry heavy loads or which can be expected to encounter large stresses, this arrangement is undesirable. In addition, the deflation route for air leaving the tire is through one of the rotary seals to a valve in the system which can be vented to atmosphere. The deflation speed of the system is limited by the size of the passageways which can be provided between the rotating members. Because two separate passageways are required between the rotating members, the maximum size of each passageway is correspondingly limited by the load bearing requirements of the rotating assembly. Thus, the deflation speed of this system is slow.

The Holbrook and Turek et al. device alleviates some of the disadvantages of the Holtzhauser system but introduce other disadvantages. The Holbrook system only requires one air supply conduit to each tire because the supply pressure used for inflating the tires is also used to operate the pilot of an inflation control valve mounted on each tire. Turek et al. utilizes a similar system. In each of these systems, applying a high pressure to the single supply conduit which is larger than any pressure to which the tires might be inflated causes the tire valve to vent tire pressure directly to the atmosphere to deflate the tires. While this is a significant advantage in deflation speed over the Holtzhauser system it is to be noted that neither the Holbrook or Turek systems allow deflation to variable pressures when using this faster deflation mode. Both Holbrook and Turek provide spring-loaded check valves which can be used to limit the maximum deflation which may occur. Furthermore, the maximum speed at which either of these systems can deflate the tire is limited by the difference between the instantaneous tire pressure and the minimum force exerted by the check valve (the minimum pressure to which the tires may be deflated). Thus, the pressure differential available to force air out of the tires is less than the instantaneous pressure available in the tires. Neither of these systems provide the flexibility to deflate the tires to a plurality of pressures as would ideally be desired in such a system.

Other systems, such as the system disclosed by Ruf allow deflation of the tires to a variable source pressure but only provide a deflation force which is equal to the difference between the instantaneous tire pressure and the applied source pressure to force air out of the tires. Furthermore, in order to achieve this capability the Ruf structure forfeits the ability to relieve pressure on the rotary seal between the tire and the adjacent nonrotating portion of the vehicle when the inflation or deflation sequence has been completed.

A further disadvantage of all of the above described prior art systems is their inability to quickly inflate the tires of the vehicle during the inflation mode. In each of the above described systems, the pressure applied to the tires during inflation is the ultimate pressure to which the tires are to be inflated. That is, if the tires are to be inflated to 50 psig the pressure applied to the tires is 50 psig. Thus, the instantaneous value of the pressure in the tires asymptotically approaches the desired, final value. The system disclosed by Goodell et al. alleviates the above described disadvantage by applying high pressure brake system air to the tires as controlled by a master-slave valve arrangement. The master valve is controlled by one of a plurality of pressures preselected by the operator and also by the pressure in a static pressure tank which is continually connected to the tires. The difference between the selected pressure and the pressure in the static pressure tank causes the slave valve to either inflate the tires with the brake system air tank pressure or deflate the tires through the rotary seals, air passageways and the master valve. Thus, while the Goodell et al. system is capable of more rapidly filling the tires than the discussed prior air systems the ability to depressurize the rotary seals is forfeited because the static pressure tank must be in continuous communication with the pressurized tires. Furthermore, deflation of the tires is routed through the rotary seals, air passageways and slave valve to an exhaust port which results in an unacceptably slow deflation speed.

From the foregoing, it is apparent that the prior art systems for remotely inflating and deflating tires are incapable of quickly inflating and deflating tires to variable pressures, while also being capable of relieving pressure on the rotary seals after the inflation or deflation cycle has been completed. It should also be apparent that the structural limitations of any one system, which allows one feature to be achieved, precludes the achievement of features shown in other systems. Furthermore, none of the systems achieve the theoretical maximum deflation speed by utilizing all of the instantaneous pressure available in the tires during deflation, to force air out of the tire to an atmospheric exhaust port.

Thus, the need exists for a central tire inflation system which can rapidly inflate tires to various pressures and which can rapidly deflate tires to various pressures selected by the operator. The system should utilize the full potential of the available instantaneous pressure in the tire to exhaust the tire, and should only utilize one fluid passage between the rotating tires and the adjacent nonrotating vehicle portion. It would also be desirable for the system to depressurize the rotating seals after the inflation or deflation cycle has been completed to improve the service life of the seals.

DISCLOSURE OF THE INVENTION

It is an object of the present invention to rapidly inflate vehicle tires from a remote vehicle operator location to any one of a plurality of pressures selected by the vehicle operator.

It is another object of the present invention to rapidly deflate the tires to one of a plurality of pressures remotely selected by the vehicle operator by utilizing the full potential of the available instantaneous tire pressure to deflate the tires.

It is still another object of the present invention to achieve the above two objects, and also to relieve pressure on rotating seals between the rotating tires and adjacent nonrotating portions of the vehicle after the inflation or deflation sequence has been completed.

It is yet another object of the present invention to achieve the above objects with a system which requires a minimum of operator supervision after a desired tire pressure has been selected.

The invention achieves these objects, and other objects and advantages which will become apparent from the description which follows, by utilizing an on-board pressure monitoring vessel which simulates the inflation and deflation characteristics of the tires. In addition, an inflation and deflation valve is provided on each of the tires and at the pressure monitoring vessel to isolate the tires and the vessel from the air distribution system after the inflation or deflation cycle is completed. The operator can select any one of a plurality of control pressures which are applied directly to the tires and monitoring vessel for deflation of the tires and depressurization of the vessel approximately to the selected control pressure. During inflation, a pressure comparison device compares the pressure in the pressure monitoring vessel to the selected control pressure. High pressure air from a pressure source is applied to the air distribution system while the selected control pressure is greater than the pressure in the pressure monitoring vessel, and therefore in the tires. Once the pressure in the tires and the vessel is approximately equal to the selected control pressure, the air distribution system, and the rotary seals are vented to atmospheric pressure.

In the preferred embodiment, the tire inflation valve utilizes a moveable, two stage pressure reaction member to seal a tire port on the valve from an atmospheric exhaust port on the valve, when the control pressure applied to a supply port on the valve is either greater than the tire pressure (for inflation), or less than a predetermined fraction of the tire pressure, (to prevent excessive deflation).

During deflation, the pressure reaction member causes fluid communication between the tire port and the atmospheric exhaust port when the supply pressure selected by the operator is between the tire pressure and a predetermined fraction of tire pressure. Because fluid communication between the tire port and exhaust port is prevented when the tire pressure and selected control pressure applied at the supply port are approximately equal, further deflation is prevented when the tire pressure is approximately equal to the supply pressure. The tire inflation and deflation valve also has a check valve which allows the high pressure air from the pressure source to inflate the tire.

In the preferred embodiment, the tire inflation and deflation valve also has a structure which cooperates with the two stage pressure reaction member to quickly close the valve, and prevent further deflation of the tire when the tire pressure becomes approximately equal to the selected control pressure at the valve supply port. Because the two stage pressure reaction member keeps the valve fully open during deflation until the tire pressure becomes approximately equal to the supply pressure, the full amount of instantaneous tire pressure is available to force air out of the tire during deflation.

BRIEF DESCRIPTION OF THE DRAWINGS

FIG. 6 is a schematic representation of a control system for inflating and deflating vehicle tires which utilizes tire inflation and deflation valve shown in FIGS. 1-5.

THE BEST MODE FOR CARRYING OUT THE INVENTION

Figure 1:
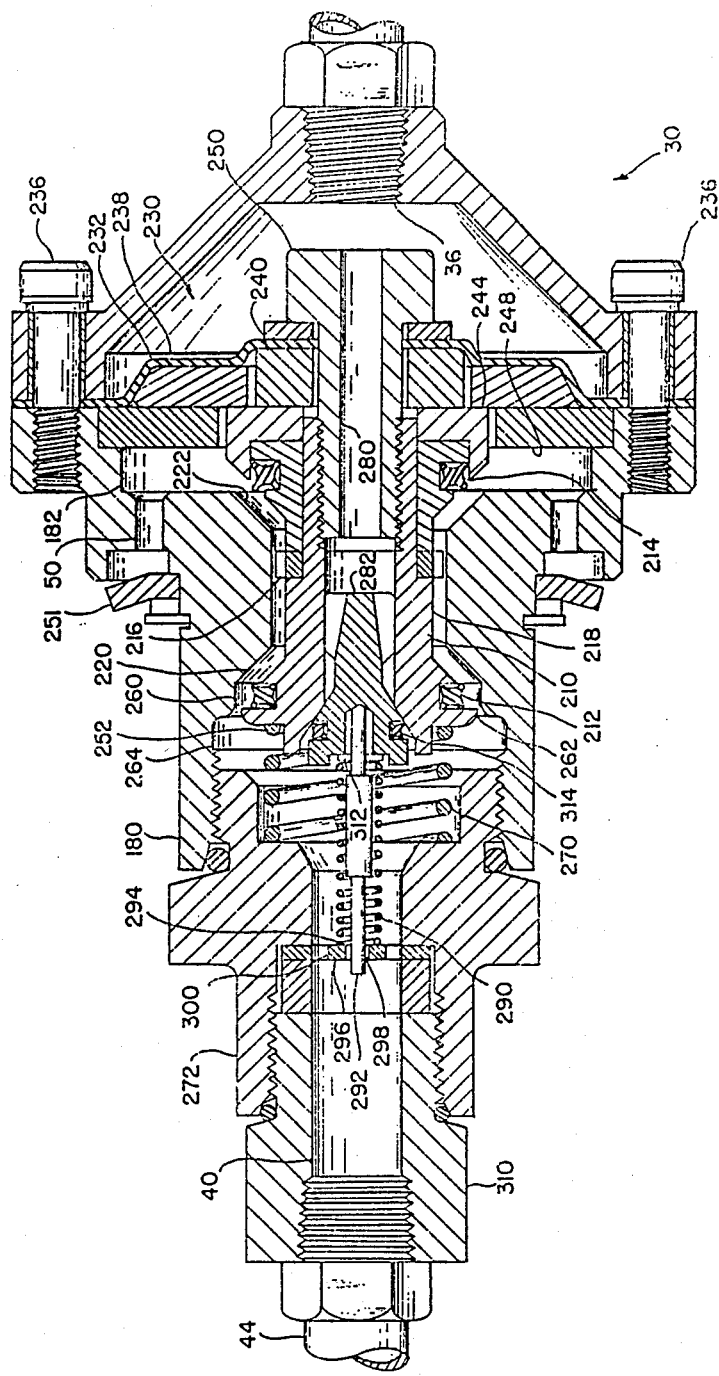
FIG. 1 is an enlarged, section view of an inflation and deflation valve in accordance with the invention.

A tire inflation system, in accordance with the present invention, is schematically illustrated in FIG. 6 and generally indicated by reference numeral 10. The system allows an operator in the cab of a vehicle to automatically inflate or deflate the vehicle tires to any one of a plurality of preselected pressures.

The tire inflation system has two substantially identical subsystems for use in a tractor-trailer combination.

A detailed diagram of the tractor subsystem is generally indicated by reference 10a. A trailer subsystem being substantially identical to the tractor subsystem, is generally indicated by the dashed area 10b. Based on the description of the tractor subsystem generally shown at reference 10a and the foregoing description, it is believed that one skilled in the art, will be able to make and use the tire inflation system on a trailer.

In FIG. 6, electrical lines are indicated by a single line, while air distribution lines are indicated by double lines.

The tractor subsystem 10a and the trailer subsystem 10b are connected to air distribution systems 14a and 14b, respectively, which are in turn pneumatically connected to air distribution manifolds 16a and 16b, respectively. The preferred embodiment shown in FIG. 6 is adapted for use with a tractor having eight wheels and a trailer having six wheels. Therefore, the tractor air distribution manifold 16a has eight branches 18a and the trailer air distribution manifold 16b has six branches 18b. Each branch leads to a rotary seal, generally indicated at reference numerals 20a and 20b between the rotating portions 22a, 22b of the tires and the adjacent nonrotating portions 24a, 24b of the tractor and trailer respectively. The details of the rotary seals 20a, 20b and the fluid communication structure between the rotating tire portion and nonrotating vehicle portions, are not considered necessary to understanding the present invention. One suitable axle system having a single air passage there through and one associated rotary seal, is manufactured by Fabco, Inc., Oakland, Calif. An axle system having a single rotary seal is preferred because the size of the air passageway between the rotating and nonrotating parts can be relatively large. Because inflation pressure is supplied through this passageway, it is desirable to utilize an axle assembly which has as large a passageway as possible without compromising the structural integrity of the drilled member. It has been found that axles for systems which require two separate fluid passageways and hence, axles which are drilled at two places, reduce the maximum size of either air passageway which would be available for supplying inflation pressure to the tires. Furthermore, if one of the passageways is off the axis of the axle, the torsional rigidity thereof will be adversely affected.

A tire inflation and deflation valve is schematically shown in boxed areas 30 in FIG. 6, and has its supply port 36, fluidly connected to the rotating portions 22a, 22b of the rotary seals for fluid communication with the air distributions 14a, 14b. The tire inflation and deflation valve and the operation thereof, is more fully illustrated in FIGS. 1-5. As will be more fully described below, the tire inflation and deflation valves operate to inflate the tires, deflate the tires or isolate the tires from the rotary seals 20a, 20b, according to pressure in the air distribution system 14a, 14b. The tires are pneumatically connected to tire ports 40a, 40b on each valve 30 by a conduit 44a, 44b. A standard Dill valve 46a, 46b can be provided at the end of conduit 44a, 44b to allow external inflation or deflation of the tires without utilizing the tire inflation system 10.

OPERATION

A brief description of the general operating procedure of the tire inflation system 10a, 10b follows. The brief description is supplemented by detailed descriptions of the tractor subsystem 10a and tire inflation and deflation valve 30. For the purpose of describing the general operation of the tire inflation system 10, it is sufficient to note that the valve 30 operates in the following manner, and as illustrated in FIGS. 2 through 5. When the tire inflation system 10 is not operating, the valve 30 is in the position schematically illustrated in FIG. 6 and FIG. 5. That is, fluid communication between the tire port 40 and an atmospheric exhaust port 50 is prevented. In addition, the valve 30 is configured, such that a pressure at the supply port 36 of the valve 30, which is less than $\frac{1}{4}$ of the pressure in the tire, will result in the valve assuming the position shown in FIGS. 5 and 6. Thus, when the system is not operating, the tires are effectively isolated from the rotary seals 20a, 20b. As will be discussed further below, the air distribution systems 14a, 14b are vented to atmosphere during nonoperation of the tire inflation system, so that pressure on the rotary seals 20a, 20b is relieved. By eliminating pressure on the rotary seals during nonoperation periods it has been found that the operating lifetime of the seals is substantially increased over systems which continually maintain pressure on the seals.

Figure 2:
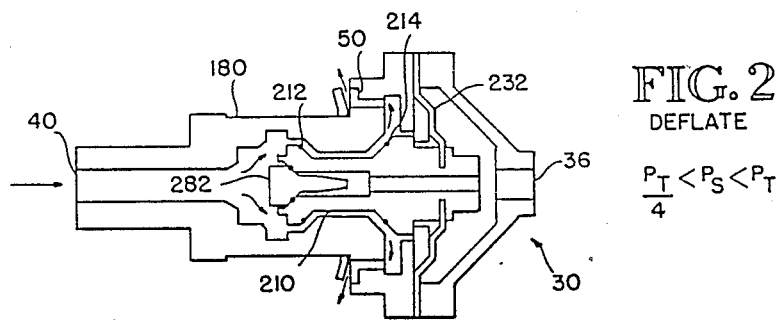
FIG. 2 is a schematic representation of the valve shown in FIG. 1 with a seal support member of the valve shown in an intermediate exhausting position, allowing fluid communication between the tire port and an atmospheric exhaust port.

When the operator desires to deflate the tires to a preselected pressure below the then existing tire pressure, the inflation system 10 supplies pressure to the air distribution systems 14a, 14b for application to the tire valves 30. As shown in FIG. 2, when pressure in the supply port 36 is less than pressure at the tire port 40, but greater than $\frac{1}{4}$ of the tire port pressure, the valve 30 assumes the configuration shown in FIG. 2 which permits fluid communication between the tire port 40 and the atmosphere exhaust ports 50 to deflate the tires. As will be more fully described below, the fluid passageway between the tire port 40 and exhaust ports 50, is held fully open until the tire pressure approximately equals the desired pressure, selected by the operator. Thus, the full difference between the instantaneous tire pressure and atmospheric pressure is available to exhaust air from the tire. This results in an extremely rapid deflation of the tires, approximately to the pressure selected by the operator Once the tire has deflated to a pressure approximately equal to the selected pressure which appears at the supply port 36, the valve quickly assumes the position shown in FIG. 3 and prevents further deflation of the tire.

To inflate the tires, the operator selects a pressure on selector switch 60, which is greater than the existing tire pressure. The tire inflation system 10a, 10b supplies pressure from a supply source 62, which is substantially greater than the pressure selected by the operator The pressure at the supply port 36 on the valve 30, being greater than the tire pressure at the tire port 40, causes the valve to assume the position shown in FIG. 4, allowing the high pressure air to inflate the tire.

As will be described more fully below, the tire inflation systems 10a, 10b have means for monitoring the inflation of the tires and stops the flow of high pressure air through the air distribution systems 14a, 14b when the pressure in the tires is approximately equal to the pressure selected by the operator. Because the supply pressure which inflates the tires, is substantially greater than the selected pressure to which the tires are to be inflated, the tires inflate more rapidly than systems which apply the ultimate desired inflation pressure directly to the tires.

Figure 5:
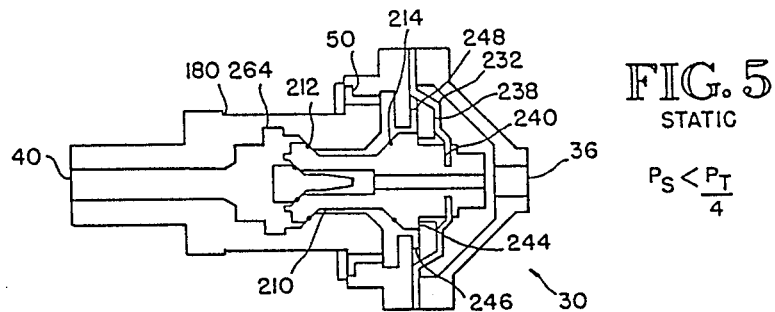
FIG. 5 is a schematic illustration of the valve of FIG. 1 shown with the seal support member in a first sealing position which occurs when the pressure at the supply port is less than a predetermined fraction of the tire pressure or when the supply pressure is zero.

After the tires have reached the selected inflation or deflation pressure, the system 10 vents the air distributions 14a, 14b to atmospheric pressure which causes the valves 30 to assume the position shown in FIG. 5. Thus, pressure on the rotating seals 20a, 20b is relieved.

Tractor Subsystem

For the purposes of this discussion, the operation of the tire inflation valve 30 can be described as follows. When the pressure in the air distribution system 14a 14b, is less than the tire pressure, but greater than a minimum default value, the tire valve 30 deflates the tire. When the pressure in the tire is equal to the pressure in the air distribution systems 14a, the tire valve closes, neither venting the tire to atmosphere nor allowing air from the air distribution 14a to enter the tire. When pressure in the passageway 14a exceeds the pressure of the tire, the tire valve allows air to enter and inflate the tire. When pressure in the air distribution system is zero, (i.e., atmospheric pressure) the tire valve 30 isolates the tire from the rotary seal 20a and the air distribution system 14a.

Pressure in the tires is simulated in a control tank 70, which is connected to a tire port 40 of a tire inflation and deflation valve 31, which is identical to the valve 30 used on the tires. Fixed orifice 80 and variable orifice 82 are provided on airline 84 which fluidly connects the supply port 36 of the tire valve 31 to the air distribution system 14a. The adjustable orifice 82 is adjusted so that the control tank 70 which has a volume of approximately one cubic foot simulates the inflation and deflation characteristics of the tires which are connected to the air distribution system. This preferred embodiment has been used on a tractor vehicle having eight 30 cubic foot tires which are connected to the branches 18a of the air distribution manifold 16a. The variable orifice 82, can be adjusted so that the control tank simulates the inflation and deflation characteristics of different tires.

Pressure in the control tank 70 is monitored by a differential pressure switch generally indicated at reference numeral 86. By monitoring the pressure of the control tank 70, between the tank and the valve 31, the pressure in the tires can be monitored without having to connect an air line between the pressure differential switch 86 and the valve stem 46 of the tires. Such external plumbing is highly undesirable.

The supply source 62 used to charge the air distribution system 14 has an air supply tank 90 to damp the output of a conventional clutch operated compressor 92, which is capable of supplying air at approximately 125 cubic feet per minute through the air distribution system and into the tires and control tank 70 through the tire valves 30 and 31. The supply tank 90 prevents the compressor 92 from cycling on and off rapidly. The high pressure air from the supply source is delivered to the distribution system 14a by a relay valve 100. The relay valve is a standard three way, two position, double piloted brake valve which throttles the pressure entering the distribution system such that whatever pressure appears in regulating air line 110, it is delivered to the distribution system 14a. A feedback pilot indicated by dotted line 112, causes the relay valve 100 to regulate the supply pressure as described. The size of the air conduit defined by the air distribution system is selected so that the minimum inflation pressure delivered by the compressor is at least 20 psi larger than the highest pressure to which the tires are to be inflated.

The remaining valves, timer and switches, control the operation of the parts previously described and are most advantageously described during a deflation and inflation cycle of the system.

Deflation

Assume that the vehicle tires and control tank 70 are pressurized to 50 psi. Assume also, that the vehicle driver wishes to move off the highway and onto soft soil and therefore desires to deflate the tires to 20 psi.

The operator first closes the toggle switch 120 which connects electrical line 122 to a positive voltage source through a fuse 124. A clutch electrical line 126, energizes a clutch solenoid which operates the compressor. Closing the toggle switch 120, also energizes a timer device 130, which supplies power to the central wiper 132 of the selector switch 60. The operator then moves the selector switch 60 to the 20 psi position (as shown) to deflate the tires (which are presently at 50 psi) to the desired pressure of 20 psi.

The timer 130, however, does not supply power to the wiper 132 until a commence button 134 is depressed. The timer device 130 is of the type which is armed when grounded through the commence button, but does not start the timing sequence until the commence button is released. That is, the timer is armed when grounded through the commence button and starts its timing cycle when the connection is opened (commence button 134 released). A suitable timer is model CWD-38-26000 manufactured by Patter and Brumfield, Princeton, Ind. When the timer is armed, electrical continuity between the wiper 132 and electrical line 122 is established. The wiper will remain energized for the length of the timing sequence (about one minute). During this period, the lamp 136 is illuminated to indicate that the tires are deflating.

Once the timer 130 is armed, current flows through the wiper 132 to the 20 psi solenoid operated control valve 140. The control valve 140 is a conventional, two position, two way solenoid actuated valve. The valve is energized (moves to the right) which allows air to flow from a conventional regulator 142 to the solenoid valve through a conduit 143 and a second regulator 144. The source of air for the conventional regulator 142 can be the tractor air supply system or the supply tank 90. The regulator 142 attenuates this pressure which is then further attenuated by regulator 144 to a pressure of 20 psi. Air pressure through the 20 psi control valve 140 and conduit 145 causes the check ball of a first shuttle valve 150 to move to the right and seal off an atmospheric vent through passage 146 and through a 40 psi solenoid operated control valve 152. The check ball of a second shuttle valve 154 is also urged to the right by the 20 psi pressure from conduit 155 to seal off the atmospheric vent through passage 157 on the right hand side of shuttle valve 154 and through a 50 psi solenoid operated control valve 156. The 20 psi air pressure is then applied to a third shuttle valve 158 and the left chamber 160 of the differential pressure switch 86 through an air conduit 161. Because the right hand side of the shuttle valve 158 is vented to atmosphere through conduit 163 and a solenoid operated inflation valve 162 the check ball of shuttle valve 158 moves to the right and 20 psi air is applied to regulating air line 110.

Note that the right chamber 164 of pressure differential switch 86 is fluidly connected to the control tank 70 which is at the presently existing tire pressure of 50 psi. Therefore, the pressure differential switch is maintained in an open position thus preventing the negative side of the energizing coil of solenoid operated inflation valve 162 from having a ground path through the pressure differential switch 86. Diode 166 also prevents the energizing coil of solenoid operated inflation valve 162 from having a ground path through the commence button 134 if accidentally depressed by the operator during the deflation cycle. The significance of this precaution will be explained more fully below. Therefore, the solenoid operated inflation valve 162 remains vented to atmosphere as long as the pressure in the control tank 70 and therefore the tires is greater than the control pressure selected by operator. Because the solenoid operated inflation valve 162 remains vented to atmosphere, the check ball in shuttle valve 158 remains in the right hand position and air at 20 psi remains in regulating air line 110.

Because the relay valve 100 throttles the supply pressure from the supply source 62 to the pressure appearing in regulating air line 110, the distribution system 14 receives pressure from the air supply tank 90 at a pressure of 20 psi. Remembering that the tires and control tank 70 were originally at 50 psi and that supplying pressure to the tire valves 30, 31 at a pressure less than the tire (or control tank) pressure causes the tires to deflate (and control tank 70 to depressurize) it is apparent that the tires will deflate (and control tank depressurize) until the pressure in the tires (and control tank) approximately equals the 20 psi pressures in the distribution system 14. When this occurs, the valves 30, 31 close thus isolating the tires and the control tank from the air distribution system 14a.

Although equal pressure now exists in chambers 160 and 164 of the pressure differential switch, the switch remains in the open position due to the action of a small bias spring schematically indicated at reference numeral 168. The bias spring 168 biases the switch to the open position so that a slightly larger control pressure in left chamber 160 is required to close the switch than exists in the control tank 70 and right chamber 164 of the switch.

At this point the tires have deflated (and the control tank 70 depressurized) to the correct pressure but the distribution system 14 is still pressurized at 20 psi. Such pressurization is undesirable because the rotary seals 20a tend to leak and wear out if continually subjected to pressure while the axle is rotating. The timer 130 is set for a period of about one minute which is known to exceed the time required to deflate the tires. When the timer times out, the electrical continuity between electrical line 122 and the wiper 132 of the selector switch 60 is discontinued. This deenergizes the solenoid of the 20 psi control valve 140 which vents the left hand side of the first shuttle valve 150 to atmosphere. Ultimately, the regulating air line 110 is vented to atmosphere through the shuttle valves 158, 154 and 150 respectively. Once this occurs, a bias spring 17 on the relay valve 100 causes the air distribution system 14 to be vented to atmosphere through the relay valve 100. The lamp 136 is also extinguished when electrical continuity between the wiper 132 and electrical line 122 is discontinued indicating to the operator that the deflation cycle has been completed.

From the foregoing, it will be apparent to one skilled in the art that if the wiper 132 had been positioned in the 40 psi position, the tires would have been deflated to 40 psi by operation of the 40 psi solenoid operated control valve 152.

Inflation

To reinflate the tires to 50 psi, as would be desirable if the vehicle moves from soft terrain onto a hard surface such as a highway the wiper 132 of the selector switch 60 is moved to the 50 psi position and the commence button 134 is depressed and released. The timer is armed and the wiper 132 energized upon depression of the commence button, but as will be explained below the timer does not start the timing sequence because the timer remains grounded through the diode 166 and the pressure differential switch 86.

Because electrical continuity is established when the timer is armed the lamp 136 is illuminated and the solenoid of the 50 psi solenoid operated control valve 156 is energized. Note that the 50 psi control valve 156 receives attenuated source pressure or tractor pressure from the regulator 142 through a secondary regulator 172 which supplies 50 psi air to the valve. A similar, secondary regulator valve 174 is provided between the regulator 142 and the 40 psi solenoid operated control valve 152. The secondary regulator 174 is adjusted to provide 40 psi air to the 40 psi solenoid operated control valve 152.

The 50 psi solenoid operated control valve 156 is thus energized and moves against the force of its bias spring to supply 50 psi air to the right side of the second shuttle valve 154. Because the left side of shuttle valve 154 is vented to atmosphere through control valves 140 and 152, the check ball of the second shuttle valve 154 moves to the left and 50 psi air is applied to the left chamber 160 of the pressure differential switch 86 and to the left side of the third shuttle valve 158.

Remembering that the pressure in the control tank 70 is approximately 20 psi and that such pressure appears in the right chamber 164 of the pressure differential switch 86 it is apparent that the electrical contacts of the switch will close, providing a ground path for the negative side of the energizing coil on solenoid operated inflation valve 162. Because the positive side of solenoid operated inflation valve 162 is at positive voltage through electrical line 122, inflation valve 162 moves to the left connecting source pressure from air supply tank 90 to the right side of shuttle valve 158. Remembering that the left side of shuttle valve 158 is exposed to a pressure of 50 psi it is apparent that the check ball therein is forced to the left causing supply pressure air to be applied to the regulating air line 110. This causes the full pressure of the supply source 62 to be applied to the air distribution system 14a. The tires are thus quickly inflated and the control tank 70 quickly pressurized to the desired pressure of 50 psi.

Because the small bias spring 168 on the pressure differential switch 86 biases the switch to the open position, the switch opens and the inflation valve 162 becomes deenergized slightly before the control tank 70 and tires reach the desired pressure. The timer has been armed by depression of the commence button 134, but the timing sequence has not begun because the timer has remained grounded through the diode 166 and closed differential switch 86.

Once the pressure differential switch 86 opens, the timer begins its timing sequence and 50 psi air is applied to the regulating air line 110 and pressure distribution system 14a to finish inflating any of the tires which have failed to reach the desired pressure or deflate any of the tires which have inflated beyond the desired pressure to the desired pressure. The period of the timer (approximately one minute) allows sufficient time for this to occur. The timer 130 then times out, deenergizing the wiper 132 of the switch 60 and the 50 psi solenoid operated control valve 156. This causes the regulating air line 110 to be vented to atmosphere. The bias spring 17 moves relay valve 100 to the vent position. The distribution system 14a is thus depressurized and valves 30, 31 move to the static position shown in FIG. 5 which isolates the tires and the control tank from the air distribution system. Because relay valve 100 is in the vent position, pressure on the rotary seals 20 is relieved.

In applications where the regulating airline 110 and air distribution system 14a are likely to be long and therefore have large volumes, a holding relay should be added in series between the commence button 134 and pressure differential switch 86. When the air distribution lines are long, high pressure air trapped therein-expands into the left chamber 160 of the switch after the switch opens. This would cause the switch to close again and restart the inflation cycle, resulting in over inflation of the tires. The holding relay prevents the switch from closing until the operator depresses the commence button on the next inflation or deflation cycle.

In an alternate embodiment of the inflation system 10, the pressure differential switch 86 is a dead band switch which requires a slightly higher pressure in either chamber 160, 164 to toggle the switch to the other position. That is, the switch is biased in both the open and closed positions. A suitable switch is available from Custom Components Switches, Inc., Chatsworth, Calif., Series 642 DE 8101. If this switch is used then on inflation, the tires will slightly over-inflate before the switch is opened and the timing cycle begun. The tires will then deflate down to the applied control pressure until the timer times out. During deflation, the switch will remain open.

The Tire Inflation and Deflation Valve 30 and 31

An enlarged, sectional, elevational view of the tire inflation and deflation valve 30 and 31 shown schematically in FIGS. 2 through 6 is shown in FIG. 1. The unique structure of the valve allows the tires to be quickly deflated approximately to the selected control pressure appearing at the supply port while the full differential between instantaneous tire pressure and atmospheric pressure is used to force air out of the tire. The valve 30 in FIG. 1 is shown in the exhaust position which corresponds to the position of the valve shown in FIG. 2. In addition to the tire port 40 and supply port 36 previously described, the valve body 180 has a plurality of atmospheric exhaust ports 50 which communicate with a fluid chamber 182 defined by the valve body. A three position spool 210 supports a first ring seal 212 and a second ring seal 214 at opposite ends thereof. Spool guides 216 are attached to the narrowest part 218 of the spool to center the spool within the fluid chamber and permit reciprocal motion of the spool within the chamber.

The fluid chamber 182 has first and second seal seat surfaces 220, 222, respectively which have a separation distance less than the separation distance between the first and second seals 212, 214 on the spool 210. Thus, the spool can be moved into a first sealing position shown in FIG. 5 when the supply port pressure is less than a predetermined fraction of the tire port pressure. In this first position, the first seal 212 is seated against the first seat 220 to prevent fluid communication between tire port 40 and the atmospheric exhaust ports 50.

Figure 3:
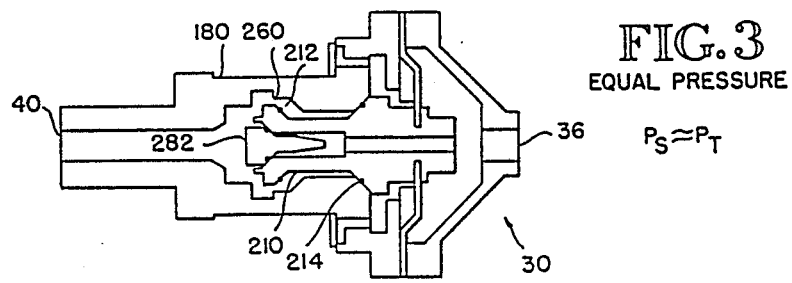
FIG. 3 is a schematic representation of the valve in FIG. 1 with the seal support member shown in a third sealing position which occurs when the tire has deflated to a pressure which is substantially equal to the pressure at the supply port.
Figure 4:
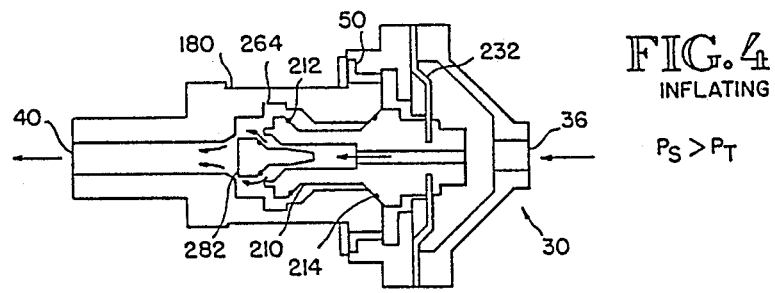
FIG. 4 is a schematic representation of the valve in FIG. 1 showing the seal support member, in the sealing position shown in FIG. 3 with an inflation check valve, shown in an inflating position which occurs when the pressure at the supply port is greater than the pressure in the tire.

The spool 210 can also be displaced fully to the left as shown in FIGS. 3 and 4 when the supply pressure is either approximately equal to or larger than the tire pressure. In this position, the second seal 214 is seated against the second seal seat 222 to prevent fluid communication between the tire port and the exhaust port. When the spool is in either of these positions, deflation of the tire is prevented. However, when the spool is in an intermediate position between these extreme positions as shown in FIGS. 1 and 2, fluid communication between the tire port 40 and exhaust ports 50 is possible. As used below, the first sealing position is the position wherein the first seal is seated as shown in FIG. 5, the second intermediate exhausting position is the position shown in FIGS. 1 and 2 and the third sealing position is the position shown in FIGS. 3 and 4 wherein the second seal is seated.

A two-stage pressure reaction member is generally indicated at reference numeral 230 and is connected to the spool 210 to control the position thereof according to the difference between pressure at the supply port 36 and at the tire port 40. The pressure reaction member is located between the atmospheric exhaust ports 50 and the supply port in the fluid chamber 182. The pressure reaction member has an elastic diaphragm 232 which seals supply port 36 from the rest of the fluid chamber 182. A cap portion 234 of the valve body 180 secures the diaphragm 232 within the fluid chamber. Bolts 236 or other means are provided to secure the cap portion of the valve body.

An outer backup ring 238 and an inner backup ring 240 divide the diaphragm 232 into first and second stages which are capable of independent and cooperative operation. As shown in FIG. 5, the inner diameter of the outer backup ring 238 is smaller than the outer diameter of the adjacent end 244 of the spool 210 so that the first and second stages of the diaphragm 232 cooperate to move the spool from the first sealing position shown in FIG. 5 to the second intermediate exhaust position shown in FIG. 2 over a limited distance indicated generally by reference numeral 246 in FIG. 5. The limited distance 246 over which both stages cooperate to displace the spool is defined by the position of a stop ring 248 within the fluid chamber 182. The stop ring 248 is positioned so that the spool is axially centered within the fluid chamber 182 in the position shown in FIGS. 1 and 2 to allow rapid deflation of the tires.

When the supply pressure is approximately equal to or greater than the tire pressure the second stage of the diaphragm adjacent to the inner backup ring 240 acts independently to displace the spool to the left, that is toward the positions shown in FIGS. 3 and 4. The force exerted on the first stage of the diaphragm adjacent to the outer backup ring 238 is transferred to the valve body 180 through the stop ring 248 and is not transmitted to the second stage or spool. The spool is fixedly attached to the inner backup ring 240 by a bolt 250.

The combined, effective surface area of the first and second stages of the diaphragm 232 is approximately four times the effective surface area of the left end 252 of the spool 210 and the area sealable by the first seal 212. Thus, a supply pressure which is more than one-quarter of the tire pressure is sufficient to unseat the first seal 212 from the first sealing position shown in FIG. 5 and deflate the tire. However, application of a control pressure at the supply port which is less than one-fourth of the tire pressure is insufficient to move the spool to the second intermediate exhausting position. This structural safeguard prevents accidental deflation of the tires to less than a minimum default value.

The effective area of the second stage of the elastic diaphragm 232 adjacent to the inner backup ring 240 is only slightly larger than the effective area of the left end 252 of the spool and the area sealable by the second seal 214. This configuration allows the spool 210 to be displaced from the second, intermediate exhaust position shown in FIG. 2 to the third sealing position shown in FIGS. 3 and 4 whenever the control pressure at the supply port is approximately equal to or greater than the tire pressure.

A circumferential dust baffle 251 can be provided adjacent to the exhaust ports 50.

As will be apparent to those skilled in the art, the two-stage pressure reaction member 230 could comprise, for example, coaxial pistons in place of the diaphragm backup-ring assembly described above. Other structural equivalents are considered to be a part of the invention.

During deflation, the exhaust path from tire port 40 to the atmospheric exhaust ports 50 is maintained fully open until the force due to the selected control pressure, acting on the second stage of diaphragm 232, exceeds the force acting on the spool 210 due to tire pressure. Thus, the full difference between the instantaneous tire pressure and atmospheric pressure is available to force air out of the tire.

The throat 260 of the valve body has been specially designed so that the separation distance between the edge 262 of the left end 252 of the spool and the throat changes as the spool is moved from the second intermediate exhaust position shown in FIG. 2 to the third sealing position shown in FIGS. 3 and 4. This causes the tire valve to quickly move to the third sealing position after the tire pressure becomes approximately equal to the selected control pressure at the supply port.

The orifice formed between the edge 262 and the throat 260 when the spool is in the second intermediate, exhaust position, is sufficiently small so that the major pressure drop between the tire port 40 and the exhaust ports 50 is at this orifice. This requires that the separation distance between the narrowest part 218 of the spool and the throat 260 be larger than the separation distance between the edge 262 and the throat when the spool is in the second intermediate, exhaust position. When the instantaneous tire pressure at tire port 40 decreases approximately to the control pressure at the supply port 36 the sum of the forces acting on the spool moves the spool to the left because the effective area of the second stage of the diaphragm 232 adjacent to the inner backup ring 240 is larger than the effective area of the left end 252 of the spool. As will be apparent from a close inspection of FIG. 1, the separation distance between the edge 262 of the spool left end 252 increases rapidly with a small axial displacement of the spool from the second, intermediate exhaust position towards the third sealing position due to the imbalance of forces on the spool. Once the edge of the spool left end enters the enlarged throat region 264, the effective area of the spool which is acted on by the tire pressure becomes the area of the narrowest part 218 of the spool. It is highly preferred to surround the circumference of the valve body with a plurality of exhaust ports 50 so that the major pressure drop between the tire and exhaust ports occurs at the narrowest part 218 of the spool rather than at the second seal 214 during deflation.

As an example, the dimensions used in this preferred embodiment are as follows. The left end 252 of spool 210 has on outer diameter of 1.009 inch at the edge 262. The inner diameter of the throat 260 opposite the edge 262, when the spool is in the second intermediate exhaust position, is 1.125 inch. Therefore, the annular orifice formed there between, has an area of approximately 0.194 inch$^2$. The outer diameter of the spool at the narrowest part 218 thereof, is 0.625 inch and the inner diameter of the throat 260 opposite the narrowest part is 0.840 inch resulting in an annular orifice having an area of approximately 0.247 inch$^2$. Thus, the major pressure drop during deflation, occurs at the edge 262 of the spool left end 252. However, with a small axial displacement of the spool to the left, the size of the annular orifice at the left end of the spool increases significantly, and the major pressure drop occurs at the narrowest part 218 of the spool. It has been found that an inner diameter of the enlarged throat region 264 of 1.125 inches is sufficient to cancel the effect of the spool left end. In the third sealing position shown in FIGS. 3 and 4, the spool is axially displaced a distance of 0.094 inch from the second, intermediate exhaust position. The smallest distance between the edge 262 of the spool left end 252 and the throat 260 is 0.110 inch.

The operation of the valve 30 and 31 is significantly different from conventional valves which typically have an increased resistance to exhaust flow as the valve is closed. In the operation of the above described valve, the resistance to exhaust gas airflow decreases when the tire pressure becomes approximately equal to the control pressure at the supply port 36 because the size of the annular orifice increases as the valve closes. This results in an extremely rapid closing of the valve to the position shown in FIG. 3. It has been found that in the system shown in FIG. 6, eight tractor tires each having a volume of approximately 30 cubic feet can be deflated from a pressure of 50 psig to 20 psig in approximately 50 seconds.

A weak bias spring 270 is placed in compression between the left end 252 of the spool 210 and an end cap 272 which is threadly received by the valve body 180. The weak bias spring is only necessary to initially position the spool 210 into the first sealing position shown in FIG. 5 when the air distribution system 14 is vented to atmospheric pressure. Because the position of the spool 210 is primarily determined by the difference between the supply port and tire port pressure, the rest spring force can be on the order of a few pounds or less.

In order to allow inflation of the tires an inflation air passageway 280 is provided in the bolt 250 and spool 210 to provide fluid communication between supply port 36 and tire port 40. An inflation check valve 282 is positioned in the passageway to prevent fluid flow between the tire port 40 and supply port 36 when the supply pressure is less than the tire pressure. The check valve 282 is biased to the closed position by a check valve spring 290 which is centered about a spring guide 292. One end 294 of the check valve spring is seated against a spring stop 296 which has a first aperture 298 for passage of the spring guide 292 therethrough. A plurality of secondary apertures 300 permit fluid communication through spring stop 296. The spring stop 296 is secured within the fluid chamber 182 by a hollow adapter bolt 310. The other end 312 of the check valve spring 290 is seated against the check valve 282 so that the check valve spring 290 is slightly compressed when the valve is in the closed position. The check valve has a conventional seal 314 which seats against a corresponding seat in the left end 252 of the spool 210.

As shown in FIG. 4, a control pressure applied at the supply port 36 which is greater than the tire pressure unseats the inflation check valve 282 permitting rapid inflation of the tires by the high-pressure air supplied directly from the supply source 62. The air passageway 280 and associated check valve 282 can be provided external to the spool 210. In this preferred embodiment, the position of the inflation air path has been chosen for manufacturing convenience. For example, in certain vehicle applications, it has been found that the inflation air passageway 280 in valve 31 should be blocked and bypassed with an external inflation passageway. It has been found that at certain times, such as vehicle start up and idle, the supply compressor 92 provides insufficient pressure on the valve 31 side of orifices 82, 80 to fully move the spool 210 to the third sealing position (FIG. 4) for inflation. Thus, inflation air can escape through the exhaust ports 50. By blocking the air passageway 280, the effective area of the second diaphragm stage is increased and a control pressure, which is slightly less than the control pressure otherwise required to move the spool to the third position, closes the valve. Pressurization of the control tank 70 occurs through the external inflation passageway.

From the foregoing, it will be appreciated that, although embodiments of the invention have been described herein for purposes of illustration, various modifications may be made without deviating from the spirit and scope of the invention. Accordingly, the invention is not limited except as by the appended claims.

What is claimed is:

1. A tire inflation and deflation valve for use on a vehicle having pressurized tires comprising:
  a body defining a fluid chamber having a tire port, a supply port and an atmospheric exhaust port therebetween and two separate seal seats positioned in the chamber between the tire port and the exhaust port;
  a three position seal support member movably positioned within the chamber between first, second and third positions, having first and second seals positioned thereon a distance apart greater than the separation distance between the seal seats for independent engagement with the seal seats so that the support member in the first and third positions prevents fluid communication between the tire port and the exhaust port and allows fluid communication therebetween to deflate the tire when the seal support is in the second intermediate position; and
  a movable, pressure reaction member having first and second stages positioned in the fluid chamber between the exhaust and supply ports to control the position of the seal support member and responsive to pressure applied at the supply port, the first stage having a pressure reaction surface exposed to the supply port and means for transferring the motion thereof to the seal support member over a limited distance, the second stage having a pressure reaction surface and means for transferring motion thereof to the seal support member wherein the combined effective area of both reaction surfaces is substantially larger than the area sealable by the first seal and wherein the effective area of the second stage is larger than the area sealable by the second seal so that a supply pressure, less than the tire pressure and greater than a preselected fraction of the tire pressure causes both stages to traverse the limited distance and move the support member from the first sealing position to the second, intermediate exhaust position to deflate the tires and so that reduction of the tire pressure approximately to the supply pressure causes the second stage to move the support member from the second, intermediate exhaust position to the third, sealing position, preventing further deflation of the tires.

2. The valve of claim 1, including means for quickly moving the seal support member from the second, intermediate exhaust position to the third sealing position when the pressure at the tire port is approximately equal to the pressure at the supply port.

3. The valve of claim 2, wherein the means for quickly moving the seal support member comprises means for restricting exhaust airflow from the tire port to the exhaust port when the seal support member is in the second, intermediate position, and means for decreasing the air flow resistance of the restricting means upon incremental displacement of the seal support member from the second, intermediate exhaust position to the third sealing position.

4. The valve of claim 3, wherein the restricting means comprises a pressure reaction surface positioned on the seal support between the tire port and the first seal and a throat portion of the valve body fluid chamber having a variable separation distance from the restricting means pressure reaction surface so that the size of the orifice formed therebetween increases rapidly as the seal support member is moved from the second, intermediate exhaust position to the third sealing position.

5. The valve of claim 1, wherein the combined effective area of the first and second stage pressure reaction surfaces on the pressure reaction member is approximately four times the area sealable by the first seal, whereby the preselected fraction of tire pressure is one fourth which when applied to the supply port moves the seal support member from the first sealing position to the second intermediate exhaust position.

6. The valve of claim 1, including a fluid passage between the supply port and the tire port, and a check valve in the passage positioned to allow fluid communication between the tire and supply ports only when pressure at the supply port exceeds pressure at the tire port to allow inflation of the tire.

7. A tire inflation and deflation valve for use on a vehicle having pressurized tires comprising:
  a valve body defining a fluid chamber having a tire port, a supply port and an atmospheric exhaust port;
  valve means for allowing fluid communication between the tire and exhaust ports to deflate the tire, only when fluid pressure at the supply port is less than the tire port pressure and greater than a predetermined fraction of the tire port pressure wherein the valve means for allowing fluid communications between the tire and exhaust ports has restricting means for quickly preventing fluid flow therebetween when the tire port pressure is approximately equal to the supply port pressure and comprising means for decreasing the air flow-resistance of the restricting means while the valve means is closing, and
  means for allowing fluid communication between the tire and supply ports to inflate the tire only when the supply port pressure exceeds the tire port pressure.

8. The valve of claim 7 wherein the means for allowing fluid communication between the tire and exhaust ports has means for maintaining a substantially constant resistance to exhaust air flow during deflation.

* * * * *